United States Patent [19]

Yeh

[11] 4,247,166
[45] Jan. 27, 1981

[54] SINGLE PLATE BIREFRINGENT OPTICAL FILTER

[75] Inventor: Pochi A. Yeh, Thousand Oaks, Calif.
[73] Assignee: Rockwell International Corporation, El Segundo, Calif.
[21] Appl. No.: 66,750
[22] Filed: Aug. 15, 1979
[51] Int. Cl.³ .............................................. G02F 1/03
[52] U.S. Cl. ..................................... 350/374; 350/408; 350/400; 356/352
[58] Field of Search ............... 350/148, 150, 157, 158; 356/352

[56] References Cited

U.S. PATENT DOCUMENTS

| 3,758,194 | 9/1973 | Daval et al. ........................ 356/352 |
| 4,129,357 | 12/1978 | Title ................................... 350/157 |

Primary Examiner—Richard A. Rosenberger
Attorney, Agent, or Firm—H. Fredrick Hamann; Craig O. Malin; John J. Deinken

[57] ABSTRACT

Disclosed is an optical filter for transmitting light in a narrow bandwidth centered about the wavelength λ, including a birefringent half-wave crystal defining an optical path through the crystal and normal to the optical axis of the crystal, the thickness of the crystal effecting a 180° phase change between the fast and slow components of light of wavelength λ along the optical path; a first polarizer preceding the crystal in the optical path and having a first polarizing plane rotated 45° about the optical path from the optic axis of the crystal; a first reflective surface preceding the first polarizer in the optical path and normal to the optical path; a second polarizer following the crystal in the optical path and having a second polarizing plane rotated 90° about the optical path from the first polarizing plane; and a second reflective surface following the second polarizer in the optical path and normal to the optical path. The crystal may further be an electro-optic birefringent crystal, the filter then additionally including first and second electrodes affixed to the crystal and adapted to apply an electric potential across the crystal in the direction of the optical path, the transmission wavelength λ thereby being tunable by adjusting the electric potential applied to the crystal.

10 Claims, 6 Drawing Figures

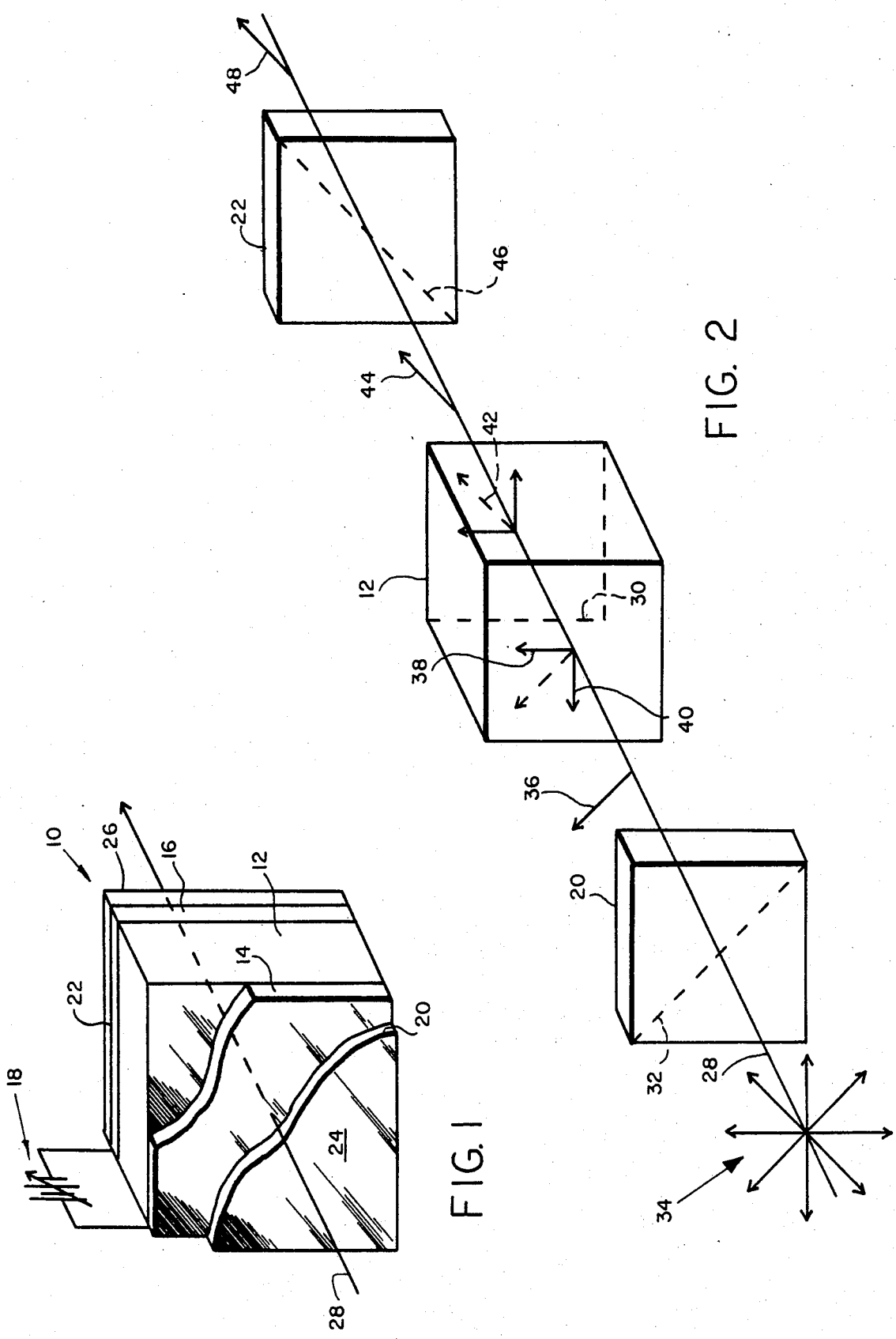

TRANSMISSION SPECTRUM

SINGLE PLATE BIREFRINGENT OPTICAL FILTER

BACKGROUND OF THE INVENTION

This invention is related to optical devices and, more particularly, to narrow band optical filters.

In many optical technology applications, there exists a need to isolate a particular wavelength of light from incident light containing a broadband of wavelengths. In the field of infrared detection, for example, a target item which must be detected, such as a particular model or type of aircraft, frequently will emit a characteristic infrared radiation spectrum containing identifiable features, such as a peak amplitude at a particular wavelength. Thus, it is desirable in detection systems to filter incident light and thereby obtain a signal with a narrow bandwidth centered about a desired wavelength and with a high rejection for the off band portion of the signal.

One filtering technique practiced in the art to obtain such a result utilizes the optical properties of a birefringent crystal. A birefringent or doubly refracting crystal will divide a light beam travelling through it into fast and slow wave components which propagate at different speeds within the crystal. If the crystal is manufactured with the proper thickness and placed with the proper orientation, it can be made to act as a half-wave plate for light of a particular wavelength λ. Furthermore, if such a half-wave crystal is sandwiched between a pair of crossed polarizers, the combination will act to filter broad band light traveling through it in such a manner that light at the particular wavelength λ (and other wavelengths for which the phase retardation caused by the crystal is 180°) will be preferentially transmitted. The separation of the bands thus produced in the transmitted spectrum by such an optical device will be inversely proportional to the thickness of the crystal.

In the design of a particular type of device, known as the Lyot-Öhman filter, a number of such crystal and polarizer combinations are aggregated with each crystal followed by one half as thick, i.e., the crystals are arranged so that the ratio of their thicknesses is 1:2:4:8, etc. With this configuration, every other maximum in the spectrum transmitted by the thickest crystal will be suppressed by a minimum in the next thinner crystal, and so on, so that it is possible with such an arrangement to isolate a few very narrow band wavelengths, which is a desirable and useful result. The Lyot-Öhman design, however, unfortunately tends to exhibit high reflection losses because of the large number of surfaces through which the incident light must pass, which results in a relatively low transmittance value for the filter. Furthermore, the large number of stages which are required in this type of filter to achieve a suitable narrow bandwidth result in a relatively bulky overall structure.

Therefore, a need has developed in the optical filtering art for a narrowband optical filter which will operate with a relatively high transmittance yet which is relatively compact and simple in its design.

SUMMARY OF THE INVENTION

It is a general object of this invention to provide a new and improved optical filter.

An optical filter for transmitting light in a narrow bandwidth centered about the wavelength λ, according to this invention, includes a birefringent half-wave crystal defining an optical path through the crystal and normal to the optic axis of the crystal, the thickness of the crystal effecting a 180° phase change between the fast and slow components of light of wavelength λ along the optical path, a first polarizer preceding the crystal in the optical path and having a first polarizing plane rotated 45° about the optical path from the optic axis of the crystal, a first reflective surface preceding the first polarizer in the optical path and normal to the optical path, a second polarizer following the crystal in the optical path and having a second polarizing plane rotated 90° about the optical path from the first polarizing plane, and a second reflective surface following the second polarizer in the optical path and normal to the optical path. The reflectance of the first and second reflective surfaces may be selected to optimize the intensity and bandwidth of the transmitted light, while the thickness of the crystal, in a preferred embodiment, is selected to transmit a bandwidth of light in the infrared portion of the spectrum.

In a more particular embodiment, the filter of this invention is tunable and includes an electro-optic birefringent half-wave crystal defining an optical path through the crystal and normal to the optic axis of the crystal, the thickness of the crystal effecting a 180° phase change between the fast and slow components of light of a wavelength λ along the optical path; first and second electrodes affixed to the crystal and adapted to apply a variable electric potential to the crystal to adjust the wavelength λ; a first polarizer deposited on the crystal and preceding the crystal in the optical path, the first polarizer having a first polarizing plane rotated 45° about the optical path from the optic axis of the crystal; a first reflective surface deposited on the first polarizer and preceding the first polarizer in the optical path, the first surface being normal to the optical path; a second polarizer deposited on the crystal and following the crystal in the optical path, the second polarizer having a second polarizing plane rotated 90° about the optical path from the first polarizing plane; and a second reflective surface deposited on the second polarizer and following the second polarizer in the optical path, the second surface being normal to the optical path. A method of filtering light, according to this invention, includes the steps of:

(a) passing the light through a first polarizer to polarize the light in a first direction;

(b) passing the polarized light through a birefringent half-wave crystal with its optic axis rotated 45° from the first direction to effect a 180° phase difference between the fast and slow components of wavelength λ;

(c) passing the polarized and phased light through a second polarizer whose polarizing direction is normal to the first direction to limit the transmitted light primarily to a bandwidth centered about the wavelength λ; and (d) multipally reflecting the light through the polarizers and the crystal, a portion of the light being transmitted after each two reflections, thereby effectively passing the light through a series of half-wave, 3/2 wave, 5/2 wave, . . . , plates to narrow the bandwidth of the composite transmitted light.

Examples of the more important features of the invention have been broadly outlined in this Summary in order to facilitate an understanding of the detailed description that follows and so that the contributions that this invention provides to the art may be better appreciated. There are, of course, additional features of the invention, which will be further described below and which are included within the subject matter of the appended claims.

BRIEF DESCRIPTION OF THE DRAWINGS

Additional objects, features, and advantages of the present invention will become apparent by referring to the detailed description below of the preferred embodiments in connection with the accompanying drawings, wherein like reference numerals refer to like elements throughout all the figures. In the drawings:

FIG. 1 is a perspective view in partial cutaway of a tunable optical filter constructed according to the present invention.

FIG. 2 is a schematic illustration depicting the effect of polarization interference on the operation of the device shown in FIG. 1;

DESCRIPTION OF THE PREFERRED EMBODIMENTS

Figure 3:
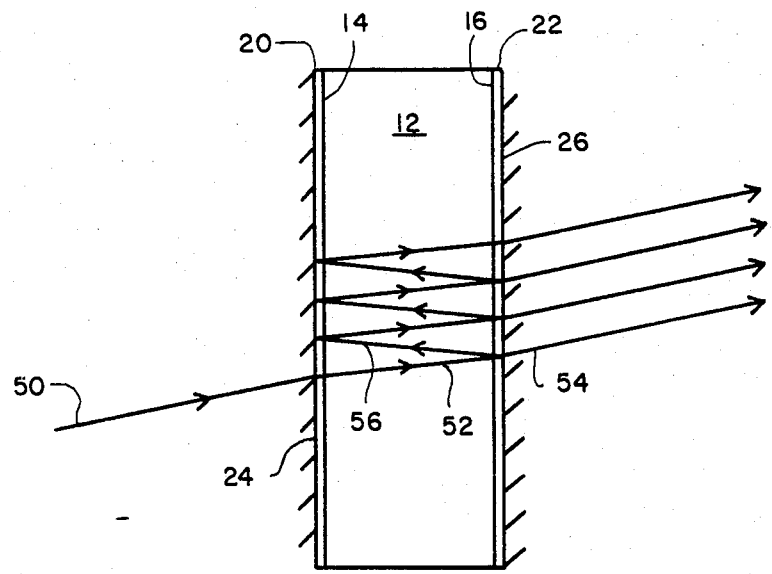
FIG. 3 is a cross-sectional side view of the device shown in FIG. 1 illustrating the manner in which the reflecting surfaces of the device produce multiple reflections within the crystal.

Now referring to the drawings, and first to FIG. 1, illustrated in a partially cutaway perspective view is a tunable optical filter 10 for transmitting light in a narrow bandwidth centered about a wavelength $\lambda$. The filter 10 includes an electro-optic birefringent half-wave crystal 12, first and second electrodes 14 and 16 affixed to the crystal, a variable source of electric potential 18 connected across the crystal through electrodes 14 and 16, first and second polarizers 20 and 22 deposited on opposite sides of the crystal 12, and first and second reflective surfaces 24 and 26 deposited on the outer surfaces of the first and second polarizers, respectively. As will be appreciated by those skilled in the art, the thicknesses of the electrodes 14 and 16, the polarizers 20 and 22, and the surfaces 24 and 26 are somewhat exaggerated in FIGS. 1–3, in order to promote a clear understanding of the invention. The filter 10 is designed to filter light traveling parallel to an optical path 28 passing in a perpendicular direction through the filter as shown. The operation of this device may be most effectively explained by separately discussing the operation in the device of the phenomena of polarization interference and the effect of multiple reflections within the crystal 12, as further illustrated in FIGS. 2 and 3, respectively.

FIG. 2 is a perspective view of part of the filter 10, including the crystal 12 and the polarizers 20 and 22, which is illustrated in a schematic and exploded manner to demonstrate the operation of the phenomenon of polarization interference within the filter. As mentioned above, the crystal 12 is a birefringent crystal. In a birefringent crystal, an incident light beam will be divided into two refracted beams along the perpendicular axes of the crystal, each of which has associated with it a different index of refraction. These two components are known as the ordinary or slow wave, with an associated index of refraction $n_o$, and an extraordinary or fast wave, with an associated index $n_e$. The fast wave, because of its different index of refraction, will travel through the crystal faster than the slow wave. Consequently, two components of a light vector having a particular polarization upon entering the crystal will undergo a change in their relative phase as those components travel through the filter. Furthermore, if the incident light is restricted to that light travelling perpendicular to the direction of the optic axis of the crystal, the fast and slow wave components will not diverge within the crystal but will emerge traveling in the same direction.

Because of this relative phase change which occurs between the fast and slow wave components, it is further possible to choose a thickness l for the crystal so that light at certain wavelengths $\lambda$ will experience a phase difference of 180° between its fast and slow components after traveling through the entire crystal. Such a crystal is known as a half-wave plate for light of the wavelengths $\lambda$, the effect of which is to rotate the direction of plane polarized light at those wavelengths by an amount $2\theta$, where $\theta$ is the angle between the optic axis of the crystal and the direction of polarization of incident light. When this angle $\theta$ is arranged to be 45°, it can thus be seen that the effect of the half-wave crystal will be to rotate the plane of polarization of light of wavelengths $\lambda$ by 90°.

This 90° rotation may be utilized to achieve an effect known as polarization interference, as shown in FIG. 2. In FIG. 2, the optic axis 30 of the crystal 12 is positioned to be perpendicular to the optical path 28. In addition, the polarization direction 32 of the first polarizer 20 is positioned at an angle of 45° with respect to the optic axis 30. Thus, incident broad band light which is polarized in random directions, as represented by the arrows 34, will selectively pass through the first polarizer 20 only for those polarization directions parallel to the polarization direction 32. Consequently, the broad band light incident upon the crystal 12 is polarized in a direction 45° from the optic axis 30, as indicated by the arrow 36. Upon entering the crystal 12, the polarized light is effectively divided into a fast component 38, which is polarized parallel to the optic axis 30, and a slow component 40, which is perpendicular to the optic axis. Upon traveling through the crystal 12, that portion of the light which is of a wavelength $\lambda$ will experience a phase shift of exactly $2n\pi$, or an integral multiple of 360°, for the fast component 38 and a phase shift of $n\pi$, or a multiple of 180°, for the slow component 40. As shown by the exiting light represented by the polarization of the arrow 42, the net effect of these two phase shifts is to rotate the incident polarization direction for light of a wavelength $\lambda$ by 90°, as shown by the arrow at 44. The second polarizer 22 is placed so that its polarization direction 46 is perpendicular to the polarization direction 32 of the first polarizer 20. Consequently, only that light having wavelengths $\lambda$ will be parallel to the polarization direction 46 and will be entirely transmitted by the second polarizer, as shown by the arrow 48. Thus, the effect of placing the half-wave birefringent crystal 12 between the crossed polarizers 20 and 22 is to selectively pass light at the wavelengths $\lambda$.

The phase difference $\delta$ induced between the fast and slow wave components of light in the crystal 12 is given by the expression:

$$\delta = (2\pi l/\lambda)(n_o - n_e). \tag{1}$$

Thus, it can be seen that this filter arrangement will selectively pass light at wavelengths λ for which the phase difference is $3\pi$, $5\pi$, $7\pi$, etc.

For such a crossed polarizer half-wave crystal, the amplitude of the transmitted spectrum is given by:

$$A \propto \cos^2[\pi(n_o - n_e)l/\lambda]n_o \qquad (2)$$

The Lyot-Öhman filter design referred to above utilizes multiple stages of this sort which are arranged with crystal thicknesses in the ratio 1:2:4:8 ... which eliminates some of the spectral lines and narrows the passband, since the amplitude for two cavities combined is proportional to a $\cos^4$ term, etc. It is an outstanding feature of the present invention, however, to provide a filter offering a narrow passband similar to that for the Lyot-Öhman filter while improving upon the disadvantages of bulkiness and low transmittance experienced by the latter design.

The improved optical filter of this invention is accomplished by utilizing a crossed polarizer crystal combination in conjunction with a set of reflective mirrors, as illustrated in FIG. 3. FIG. 3 is a cross sectional side view of the filter shown in FIG. 1. In FIG. 3, the incident light 50 passes through the first reflective surface 24, the first polarizer 20, the first electrode 14, and into the crystal 12. After passing through the crystal, the light beam 52 proceeds through the second electrode 16, a second polarizer 22, and impinges on the second reflective surface 26, where a first portion 54 of the beam is transmitted, while a second portion 56 is reflected back into the crystal 12. As shown in FIG. 3, the reflected portion of the light beam is reflected back and forth many times within the crystal, with a portion of the beam being transmitted upon each reflection from the second reflective surface 26. One result of these multiple paths of travel for the light is the interference which occurs between the various portions of the transmitted beam, similar to the interference caused in a Fabry-Perot interferometer. In addition, the multiple paths of the light through the crystal 12 create in effect a series of plates acting as half-wave, 3/2-wave, 5/2-wave, etc. plates, because of the distance traveled by the light for each succeeding reflection. As a result, the filter performs like a combination of filters similar to a Lyot-Öhman filter. With this arrangement, the net transmission T for the filter is given by:

$$T = \frac{(1 - R)^2 \sin^2(\Gamma/2)}{[1 - R\sin^2(\Gamma/2)]^2 + 4R\sin^2(\Gamma/2)\sin^2\phi} \qquad (3)$$

where:
$\phi = 2\pi/\lambda n_o l$,
$\Gamma$ = phase retardation,
R = reflectivity of the polarizers,
$n_o$ = refractive index at 0 volts,
l = thickness of the crystal,
λ = wavelength.

As is evident from Equation 3, the transmission will be 100% when the retardation $\Gamma$ as well as the phase accumulation $\phi$ are equal to an integral multiple of $\pi$. $\sin^2\phi$ is a fast varying function of λ while $\sin^2(\Gamma/2)$ is a slowly varying one. Thus, the transmission spectrum will consist of many closely spaced Fabry-Perot lines under an envelope which is governed by the electro-optic tuning. The finesse F of this structure is given by:

$$F \approx 4.88/\sqrt{1-R} \qquad (4)$$

The tuning range for this device is potentially as large as 1 μm to 16 μm, while the bandwidth can be made as small as 100 Å. By varying the source 18 of electric potential applied across the electrodes 14 and 16, the indices of refraction for the crystal 12 can be varied, thereby affording a means to quickly change the wavelength λ for which the filter provides a maximum in the transmission spectrum.

Figure 4:
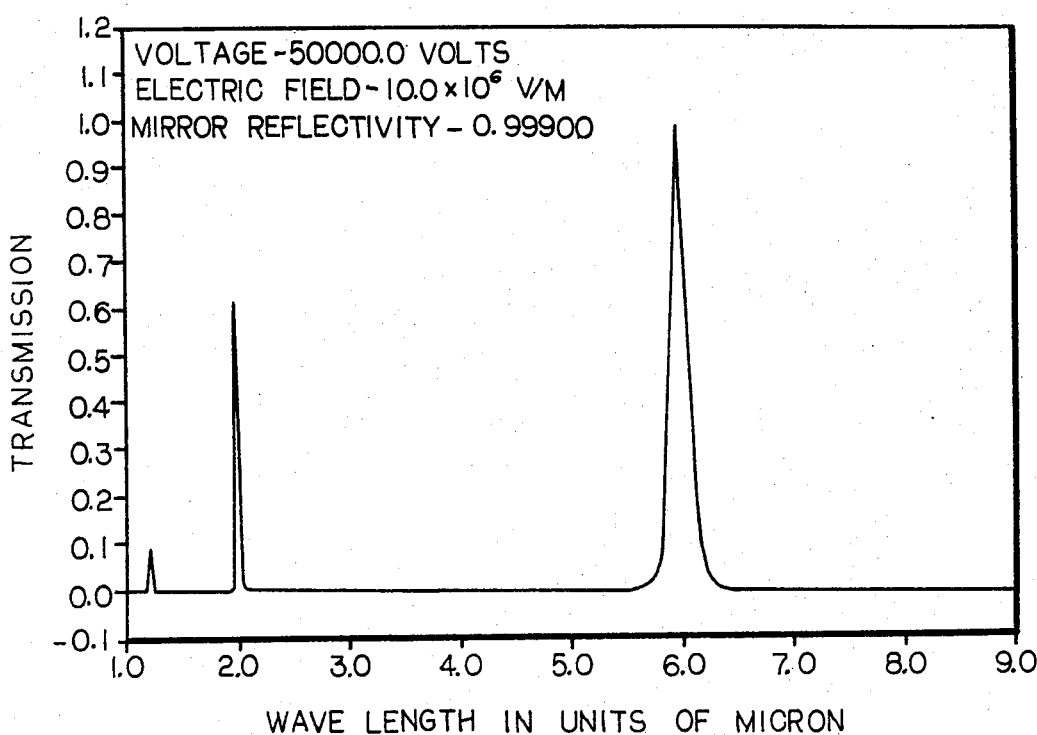
FIGS. 4–6 are graphical plots depicting the transmission spectrum of a filter constructed according to this invention and the manner in which that spectrum may be varied by varying the applied electric field.
Figure 5:
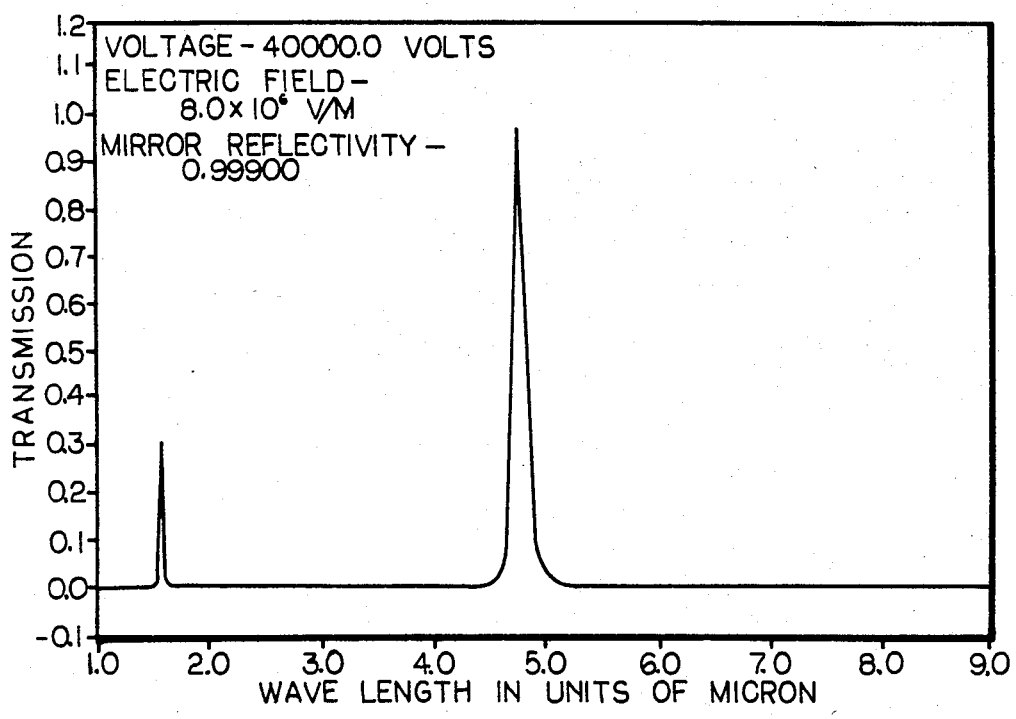
Figure 6:
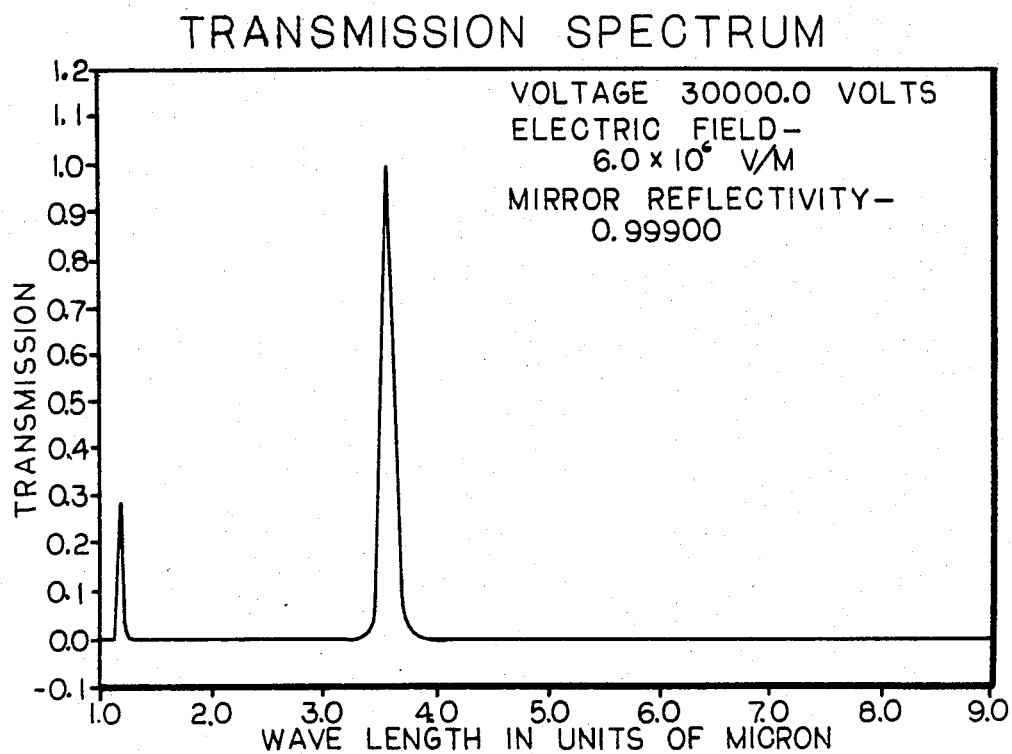

FIGS. 4, 5, and 6 are plots of the transmission spectrum which is theoretically expected for the filter 10 for different electric fields applied across the crystal 12. These plots were computed for a filter composed of a crystal of gallium arsenide having a thickness of 5,000 microns and with first and second reflective surfaces adjusted to a reflectivity of 0.999. The plots in FIGS. 4, 5, and 6 represent applied voltages of 50,000, 40,000, and 30,000 volts, respectively. As can be seen from the spectrum plots, the filter of this invention provides a passband with a very high transmission and a desirably narrow bandwidth.

In conclusion, although typical embodiments of the present invention have been illustrated and discussed herein, numerous modifications and alternative embodiments of the apparatus and method of this invention will be apparent to those skilled in the art in view of this description. Accordingly, this description is to be considered as illustrative only and is provided for the purpose of teaching those skilled in the art the manner of constructing the apparatus and performing the method of this invention. Furthermore, it should be understood that the forms of the invention depicted and described herein are to be considered as the presently preferred embodiments. Various changes may be made in the configurations, sizes, and arrangements of the components of the invention, as will be recognized by those skilled in the art, without departing from the scope of the invention. Equivalent elements, for example, might be substituted for those illustrated and described herein, parts or connections might be reversed or interchanged, and certain features of the invention might be utilized independently of the use of other features, all as will be apparent to one skilled in the art after receiving the benefit obtained through reading the above description of the invention.

What is claimed is:

1. An optical filter for transmitting light in a narrow bandwidth centered about the wavelength λ, comprising:
   a birefringent half-wave crystal defining an optical path through said crystal and normal to the optic axis of said crystal, the thickness of said crystal effecting a 180° phase change between the fast and slow components of light of wavelength λ along said optical path;
   a first polarizer preceding said crystal in said optical path and having a first polarizing plane rotated 45° about said optical path from the optic axis of said crystal;
   a first reflective surface preceding said first polarizer in said optical path and normal to said optical path;
   a second polarizer following said crystal in said optical path and having a second polarizing plane rotated 90° about said optical path from said first polarizing plane; and
   a second reflective surface following said second polarizer in said optical path and normal to said optical path.

2. The filter of claim 1, wherein the reflectance of said first and second reflective surfaces is selected to optimize the intensity and bandwidth of the transmitted light.

3. The filter of claim 1, wherein the thickness of said crystal is selected to transmit a bandwidth of light in the infrared portion of the spectrum.

4. The filter of claim 1, wherein said first and second reflective surfaces are deposited on said first and second polarizers, respectively.

5. The filter of claim 4, wherein said first and second polarizers are deposited on said crystal.

6. The filter of claim 1, wherein said crystal further comprises an electro-optic birefringent crystal, said filter further comprising first and second electrodes affixed to said crystal and adapted to apply an electric potential across said crystal in the direction of said optical path, the transmission wavelength $\lambda$ thereby being tunable by adjusting the electric potential applied to said crystal.

7. A tunable optical filter for transmitting light in a narrow bandwidth centered about a wavelength $\lambda$, comprising:
- an electro-optic birefringent half-wave crystal defining an optical path through said crystal and normal to the optic axis of said crystal, the thickness of said crystal effecting a 180° phase change between the fast and slow components of light of wavelength $\lambda$ along said optical path;
- first and second electrodes affixed to said crystal and adapted to apply a variable electric potential to said crystal to adjust the wavelength $\lambda$;
- a first polarizer deposited on said crystal and preceding said crystal in said optical path, said first polarizer having a first polarizing plane rotated 45° about said optical path from the optic axis of said crystal;
- a first reflective surface deposited on said first polarizer and preceding said first polarizer in said optical path, said first surface being normal to said optical path;
- a second polarizer deposited on said crystal and following said crystal in said optical path, said second polarizer having a second polarizing plane rotated 90° about said optical path from said first polarizing plane; and
- a second reflective surface deposited on said second polarizer and following said second polarizer in said optical path, said second surface being normal to said optical path.

8. An optical filter for transmitting light in a narrow bandwidth centered about the wavelength $\lambda$, comprising:
- means for polarizing the light in a first direction;
- means to effect a 180° phase difference between the fast and slow components of the polarized light at the wavelength $\lambda$;
- means to pass only that portion of the polarized and phased light which is polarized normal to the first direction, thereby limiting the transmitted light primarily to a bandwidth centered about the wavelength $\lambda$; and
- means for multipally reflecting the light through the polarizing, phase differencing, and limiting means, a portion of the light being transmitted after each two reflections, thereby effectively passing the light through a series of half-wave, 3/2 wave, 5/2 wave, . . . , etc. plates to narrow the bandwidth of the composite transmitted light.

9. A method of filtering light, comprising the steps of:
(a) passing the light through a first polarizer to polarize the light in a first direction;
(b) passing the polarized light through a birefringent half-wave crystal with its optic axis rotated 45° from the first direction to effect a 180° phase difference between the fast and slow components of wavelength $\lambda$;
(c) passing the polarized and phased light through a second polarizer whose polarizing direction is normal to the first direction to limit the transmitted light primarily to a bandwidth centered about the wavelength $\lambda$; and
(d) multipally reflecting the light through the polarizers and the crystal, a portion of the light being transmitted after each two reflections, thereby effectively passing the light through a series of half-wave, 3/2 wave, 5/2 wave, . . . , etc. plates to narrow the bandwidth of the composite transmitted light.

10. The method of claim 9, wherein step (b) further comprises passing the light through an electro-optic birefringent crystal, and further comprising the step of:
(e) applying a voltage across the crystal to vary the refractive index of the crystal and thereby adjust the wavelength $\lambda$ of the transmitted bandwidth.

* * * * *